April 15, 1952      A. F. PAMER      2,592,727

AUTOMATIC FISHHOOK

Filed May 7, 1951

INVENTOR
ANDREW F. PAMER
BY
ATTORNEY

UNITED STATES PATENT OFFICE 2,592,727

AUTOMATIC FISHHOOK

Andrew F. Pamer, San Francisco, Calif.

Application May 7, 1951, Serial No. 224,983

3 Claims. (Cl. 43—15)

This invention relates to fish hooks, and more particularly to an automatic fish hook which is adapted to securely attach itself to a fish when the strike is made.

The present invention provides a fish hook which is adapted to automatically project its pointed or barbed end portion firmly into the mouth structure of a fish when the strike is made. My improved fish hook comprises a releasable spring device which is adapted to automatically impel the pointed or barbed portion of the hook into the mouth structure of the fish when the strike is made, thereby securely attaching the hook to the fish.

The primary object of my invention is to provide an automatic fish hook of the kind characterized, wherein spring means is employed for automatically projecting the pointed or barbed portion of the fish hook into the mouth structure of a fish when the strike is made.

Other and further objects of my invention will be pointed out hereinafter or will be indicated in the appended claims or will be obvious to one skilled in the art upon an understanding of the present disclosure. For the purpose of this application I have elected to show herein certain forms and details of an automatic fish hook representative of our invention; it is to be understood, however, that the embodiment of my invention herein shown and described is for the purpose of illustration only and that therefore it is not to be considered exhaustive of the variations of the invention.

Figure 1:
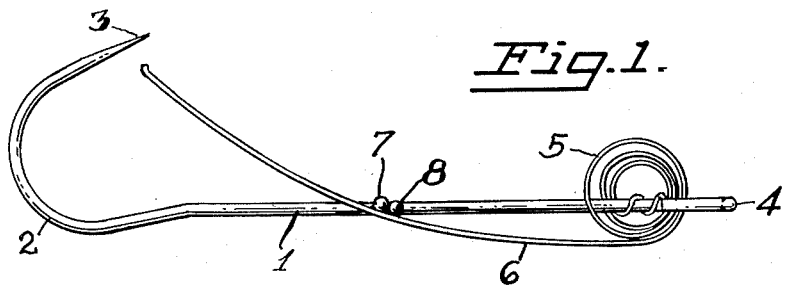
Fig. 1 is a side elevational view of an automatic fish hook embodying my invention, showing the spring means in a set or cocked position.
Figure 2:
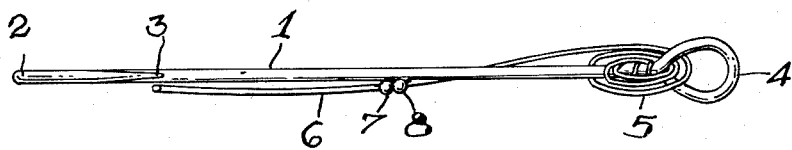
Fig. 2 is a plan view of the same.
Figure 3:
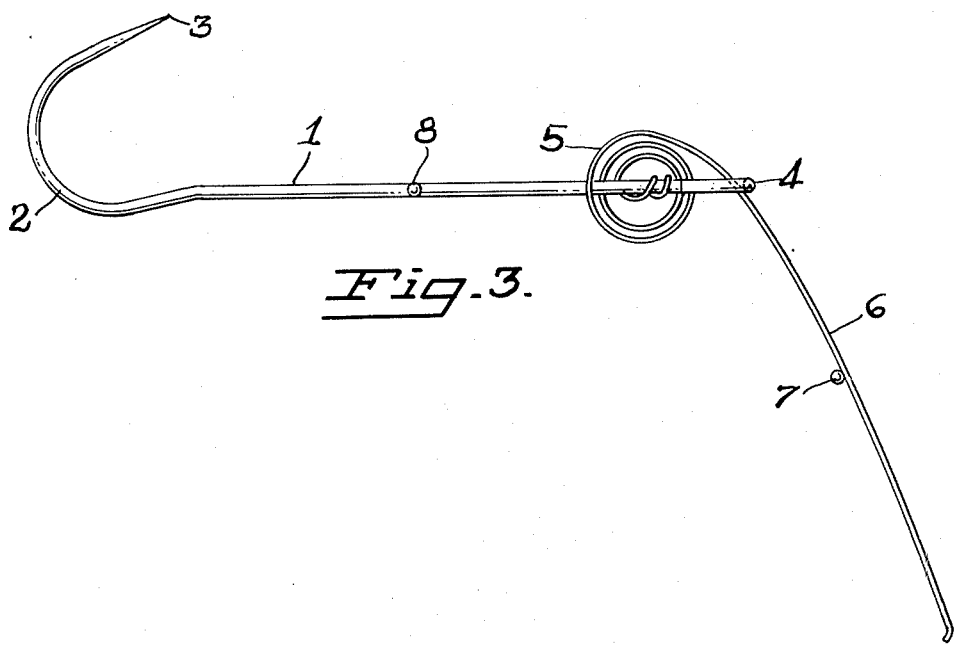
Fig. 3 is a side elevational view of the fish hook, showing the spring means in a released position.

Referring to the drawings, the numeral 1 designates the shank of a fish hook, 2 the hooked end portion which terminates in a pointed or barbed end 3, and 4 the eye to which a fishing line or leader is normally attached.

Secured at its inner end to that part of the shank 1 located directly adjacent the eye 4 is a coiled or spiral spring 5, the convolutions of which loosely extend through the said eye. The coiled spring is so arranged that at least one of its convolutions extends across the shank at one side thereof while the remaining convolutions are similarly positioned at the opposite side of the said shank. By positioning the coiled spring with its convolutions arranged at opposite sides of the shank and also extending through the eye 4, the said spring is held against rotation but at the same time it may freely expand and contract.

The spring 5 is provided with an elongated curved extension 6 which is of sufficient length to extend across the shank 1 to approximately the pointed end 3 of the fish hook. A protuberance 7 of somewhat globular shape is formed on or secured to the extension 6 of the spring 5 and a similar protuberance 8 is formed on or secured to the shank 1. The protuberances 7 and 8 are so arranged on the extension 6 and the shank 1 that when the coiled spring 5 is suitably contracted and the extension is manually lengthened the said protuberances may be brought into locked engagement with one another, as shown in Fig. 1, thereby holding the spring and its extension in a cocked or set position with the free end of the extension arranged adjacent the pointed end 3 of the hook. A suitable pressure exerted on the free end of the extension 6 in a direction toward the shank 1, as when a fish strikes the hook, will cause the protuberance 7 of the extension to become released from the protuberance 8 of the shank. When the said protuberances become disengaged the tension of the spring 5 actuates the extension 6 downwardly away from the shank 1, thereby causing the hooked end portion 2 of the fish hook to suddenly move upwardly. Such a sudden movement of the pointed or barbed end 3 of the hook at the time the fish strikes the hook in attempting to take the bait, will cause the said pointed end to be firmly projected into the mouth structure of such fish, thereby securely attaching the fish hook to the fish.

My invention may be used with various sizes and kinds of fish hooks, and the spring with its extension may also assume other shapes and forms.

What I claim is:

1. In an automatic fish hook, a shank having an eye at one end and a pointed hook at its opposite end, a coiled spring secured at its inner end to the shank and arranged with its convolutions extending loosely through the eye, and an extension connected to the outer convolution of the spring, the said extension in a set position being adapted to extend across the shank to a position adjacent the pointed end of the hook, and means on the shank and the extension for releasably holding the extension in its set position.

2. In an automatic fish hook, a shank having an eye at one end and a pointed hook at its opposite end, a coiled spring secured at its inner end to the shank and arranged with its convolutions extending loosely through the eye, the said spring having an elongated extension connected to its outer convolution, the said extension in a cocked position being adapted to extend across the shank to a position with its free end located adjacent the pointed end of the hook, a protuberance on the shank, and a protuberance on the extension, the said protuberances being arranged to releasably lock with one another when the extension is in its cocked position.

3. In an automatic fish hook, a shank having means at one end for attaching a line and a pointed hook at its opposite end, a spring secured to the shank at a point adjacent the line attaching means, the said spring having an extension arranged to swing from a cocked position extending across the shank with its free end located near the pointed end of the hook to a position remotely removed from the shank, releasable holding means on the shank, and cooperating holding means on the extension, the said holding means of the shank and the extension being constructed and arranged to releasably lock with one another, whereby the extension may be releasably held in a cocked position against the tension of the spring.

ANDREW F. PAMER.

REFERENCES CITED

The following references are of record in the file of this patent:

UNITED STATES PATENTS

| Number | Name | Date |
| --- | --- | --- |
| 2,531,995 | Sweetman | July 9, 1948 |